(12) United States Patent
Schmied

(10) Patent No.: US 7,651,218 B2
(45) Date of Patent: Jan. 26, 2010

(54) NOSE SUPPORT FOR A PAIR OF SPECTACLES

(75) Inventor: Klaus Schmied, Linz (AT)

(73) Assignee: Silhouette International Schmied AG, Linz (AT)

( * ) Notice: Subject to any disclaimer, the term of this patent is extended or adjusted under 35 U.S.C. 154(b) by 135 days.

(21) Appl. No.: 11/918,103

(22) PCT Filed: Feb. 22, 2006

(86) PCT No.: PCT/AT2006/000071

§ 371 (c)(1),
(2), (4) Date: Oct. 9, 2007

(87) PCT Pub. No.: WO2006/113949

PCT Pub. Date: Nov. 2, 2006

(65) Prior Publication Data

US 2009/0086157 A1 Apr. 2, 2009

(30) Foreign Application Priority Data

Apr. 25, 2005 (AT) ............................... A 694/2005

(51) Int. Cl.
*G02C 5/12* (2006.01)
(52) U.S. Cl. .......................... 351/138; 351/78; 351/80; 351/136; 351/137
(58) Field of Classification Search ................ 351/136, 351/137, 138, 139, 80, 41, 78
See application file for complete search history.

(56) References Cited

U.S. PATENT DOCUMENTS 6,536,897 B1 * 3/2003 Kroman .................... 351/138
7,147,322 B2 12/2006 Spindelbalker

FOREIGN PATENT DOCUMENTS

| AT | 411 800 | 5/2004 |
|---|---|---|
| DE | 34 17 255 | 11/1985 |
| EP | 0 018 651 | 11/1980 |
| EP | 0 032 475 | 7/1981 |
| EP | 0 141 767 | 5/1985 |
| EP | 0 922 987 | 6/1999 |
| EP | 1 217 417 | 6/2002 |
| EP | 1 469 337 | 10/2004 |

OTHER PUBLICATIONS

International Search Report.

* cited by examiner

*Primary Examiner*—Hung X Dang
(74) *Attorney, Agent, or Firm*—Collard & Roe, P.C.

(57) ABSTRACT

A nose support for a pair of spectacles having a nose rest (2) and having a retainer (1), comprising a wire part (3), for the nose rest (2) is described, which has an undercut pocket (8) for the plug reception of an eye bent out of one end of the wire part (3). To provide advantageous design conditions, it is suggested that the end of the wire part (3) forming an eye be bent in a hairpin shape, the web (4) connecting the two legs (5, 6) of the hairpin-shaped end section forming a round eye (7) expanded in relation to the adjoining legs (5, 6), and the pocket (8) of the nose rest (2) expanding outward on one hand away from the undercut in the plane of the hairpin-shaped bent legs (5, 6) of the wire part (3) and on the other hand transversely to this plane over the entire pocket depth.

3 Claims, 1 Drawing Sheet

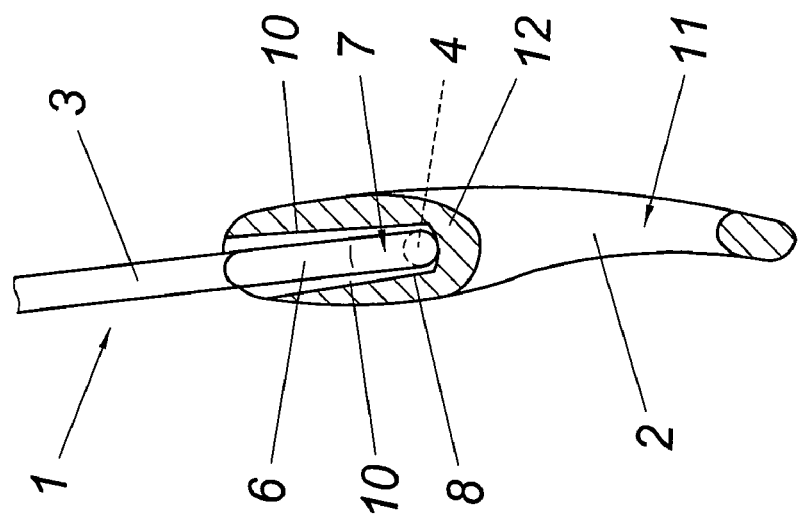
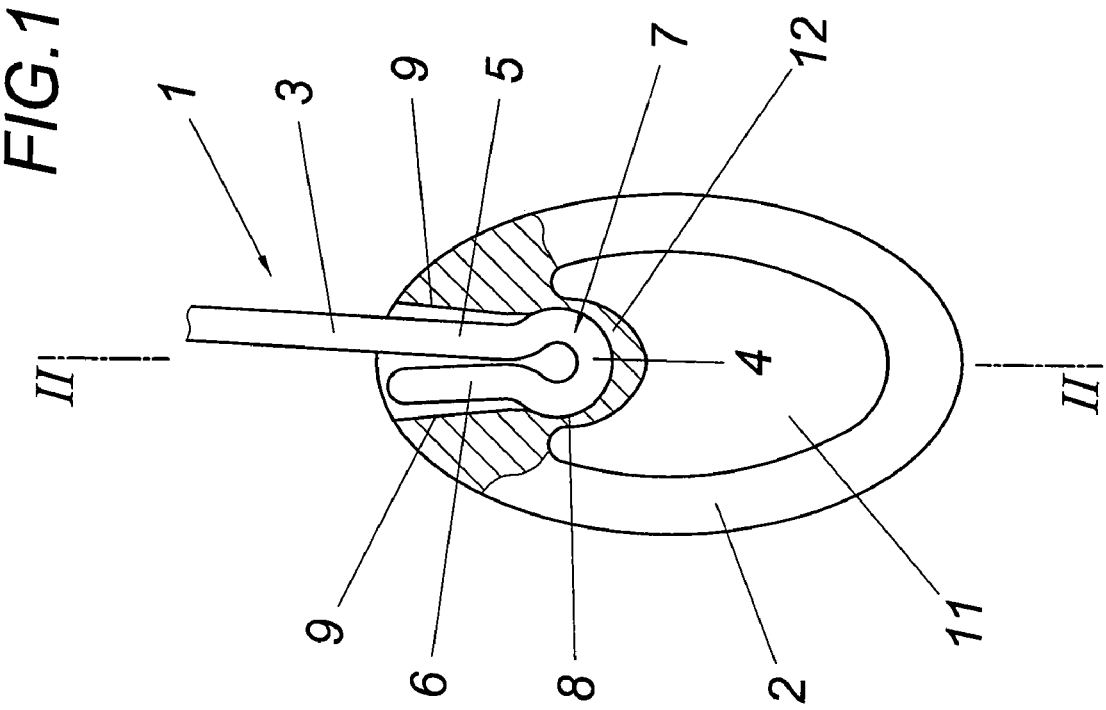

NOSE SUPPORT FOR A PAIR OF SPECTACLES

CROSS REFERENCE TO RELATED APPLICATIONS

Applicant claims priority under 35 U.S.C. §119 of Austrian Application No. A 694/2005 filed Apr. 25, 2005. Applicant also claims priority under 35 U.S.C. §365 of PCT/AT2006/000071 filed Feb. 22, 2006. The international application under PCT article 21(2) was not published in English.

FIELD OF THE INVENTION

The present invention relates to a nose support for a pair of spectacles having a nose rest and a retainer for the nose rest comprising a wire part, which has an undercut pocket for the plug receptacle of an eye bent out of one end of the wire part.

DESCRIPTION OF THE PRIOR ART

To support spectacles on the nose of a spectacle wearer, nose supports are known (AT 411 800 B), which have a nose rest made of a comparatively soft elastomer and a retainer anchored in the nose web of the spectacle frame, for example, which comprises a wire part which is bent into an essentially rectangular eye in the area of its end receiving the nose rest. This eye engages in a formfitting way in an undercut pocket of the nose rest, so that after the nose rest is put onto the retainer with elastic expansion of the undercut pocket to receive the eye, the necessary connection is produced between the retainer and the nose rest. Such a plug connection does not allow any relative movement between the retainer and the nose rest, however. The adaptation of the nose rest to the particular nose shape is thus exclusively a function of the bending behavior of the nose rest.

Similar disadvantages occur in other known nose supports, in which U-shaped bent wire parts are used as retainers for nose rests. Thus, providing a pocket hole conically expanded on the insertion side, in which the free leg of the U-shaped bent wire part engages, on a shoulder of the nose rest is known (DE 34 17 255 A1). To retain the free leg, it is provided with a hammerhead, which works together with an undercut of the pocket hole, a pivot lock being ensured. In another design (EP 1 217 417 A1), the nose rest has two grooves on a shoulder on diametrically opposite sides, in which the end of the wire part shaped into an eye engages. Finally, clamping the two legs of the U-shaped bent wire part between two partial blocks of a projection embedded in the nose rest using a screw is known (EP 0 032 475 A1), which in turn provides a formfitting connection which precludes limited mobility of the nose rest in relation to the wire part.

SUMMARY OF THE INVENTION

The present invention is thus based on the object of designing a nose support for a pair of spectacles of the type described at the beginning in such a way that improved adaptation of the nose rest to the particular nose shape is achieved, without having to forsake simple production and assembly conditions.

The present invention achieves the stated object in that the end of the wire part forming the eye is bent in the shape of a hairpin, the web connecting the two legs of the hairpin-shaped end section forming a round eye expanded in relation to the adjoining legs, and the pocket of the nose rest expands outward on one hand away from the undercut in the plane of the hairpin-shaped bent leg of the wire part and on the other hand transversely to this plane over the entire pocket depth.

As a result of the eye implementation as a round eye, a requirement for a rotation of the nose rest in relation to the retainer around the eye axis is provided in a simple way. Therefore, the pocket of the nose rest merely needs to be expanded outward away from the undercut in the plane of the hairpin-shaped bent leg of the wire part to ensure limited pivotability of the nose rest around the eye axis. Because the pocket of the nose rest additionally expands over the entire pocket depth transversely to the shared leg plane, the nose rest may also be pivoted, delimited by a stop, around an axis running transversely to the eye axis, which allows automatic adaptation of the nose rest to the particular nose shape, because the nose rest may press flatly against the nose because of the degrees of freedom provided by its mounting. The simple plug connection between the retainer and the nose rest is not impaired by this limited movable retention of the nose rest. The nose rest may be plugged into the retainer in a way comparable to the prior art under an expansion of the undercut pocket to receive the round eye, until the round eye engages in the undercut.

Especially simple design conditions result if the two legs of the hairpin-shaped bent end of the wire part diverge away from the connection web forming an essentially closed round eye and thus form a rotation stop for the rotational movement of the nose rest around the eye axis.

Because the retention of the nose rest occupies comparatively little space, the possibility results of implementing the nose rest as annular and providing a shoulder projecting radially into the open annular space of the nose rest to receive the pocket. The annular opening offers greater wearing comfort because of the ventilation of the contact area of the nose connected thereto.

BRIEF DESCRIPTION OF THE DRAWING

The subject matter of the present invention is illustrated as an example in the drawing.

FIG. 1 shows a nose support according to the present invention for a pair of spectacles in a partially cutaway side view of the nose rest, and FIG. 2 shows a section along line II-II of FIG. 1.

DESCRIPTION OF THE PREFERRED EMBODIMENT

The illustrated nose support for a pair of spectacles has a retainer 1, which engages on the nose web of a spectacle frame, for example, for a nose rest 2. This retainer 1 comprises a wire part 3, whose end receiving the nose rest 2 is bent in a hairpin shape, the connection web 4 between the two legs 5, 6 of the hairpin-shaped bent end of the wire part 3 forming a round eye 7, which is expanded in relation to the two legs 5, 6, as may be inferred from FIG. 1.

The nose rest 2 is provided with an undercut pocket 8 for the plug receptacle of the hairpin-shaped bent end of the wire part 3, the pocket 8 being implemented in such a way that it receives the round eye 7, which is expanded in relation to the legs 5, 6, in its undercut section. The front walls 9 of the pocket 8 originating from this undercut pocket section expand outward away from the undercut pocket section, so that the nose rest 2 is mounted so it is pivotable in a limited way around the axis of the round eye in relation to the retainer 1. The legs 5, 6 of the hairpin-shaped bent end of the wire part 3 diverge outward away from the round eye 7, so that these two legs 5, 6 each provide a rotational stop for the nose rest 2 which works together with the front walls 9 of the pocket 8.

As may be seen from FIG. 2, the side walls 10 of the pocket 8 also run diagonally to one another, and do so over the entire pocket depth, i.e., also over the area of the undercut pocket section. This outwardly opening inclination of the side walls 10 to one another allows pivoting of the nose rest around a transverse axis to the eye axis, which allows automatic adaptation of the position of the nose rest 2 to the particular nose shape. The limited pivotability of the nose rest 2 around the eye axis and a transverse axis thereto ensures, in spite of the advantageous adaptation possibility, a starting position of the nose rest 2 which does not impair putting on the pair of spectacles.

The relatively small space requirement for the retention of the nose rest 2 allows an annular implementation of the nose rest 2, which must only be provided with a shoulder 12 projecting radially inward into the open annular space 11 to receive the pocket 8. This open annular space 11 allows ventilation of the placement area of the nose rest 2 on the nose, which improves the wearing comfort for the nose support.

The invention claimed is:

1. A nose support for a pair of spectacles comprising:
   (a) a nose rest comprising an undercut pocket having a pocket depth; and
   (b) a retainer for the nose rest, said retainer comprising a wire part having a first bent hairpin-shaped end section comprising first and second legs and a connection web connecting the first and second legs to form a round eye received in the undercut pocket and expanded in relation to the first and second legs, the undercut pocket expanding in a first direction outwardly in a plane of the first and second legs and in a second direction transversely to said plane over the pocket depth.

2. The nose support according to claim 1, wherein the first and second legs diverge away from the connection web to essentially close the round eye.

3. The nose support according to claim 1, wherein the nose support has an open annular space, and the undercut pocket extends into a shoulder projecting radially into the open annular space of the nose support.

* * * * *